May 28, 1957 G. F. QUAYLE 2,793,875
CASTER WHEEL TILTING MOUNT FOR CORNER DRIVE TRUCK
Filed May 18, 1954 2 Sheets-Sheet 1
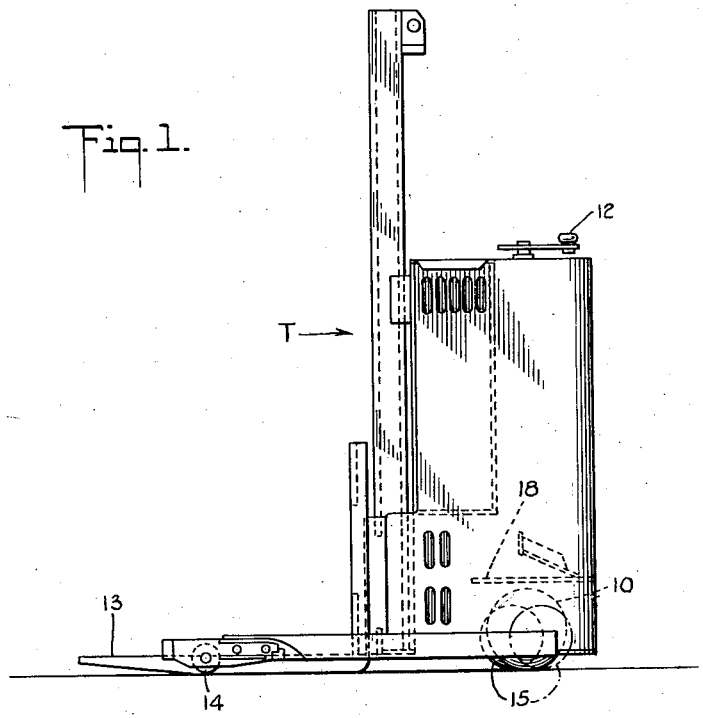
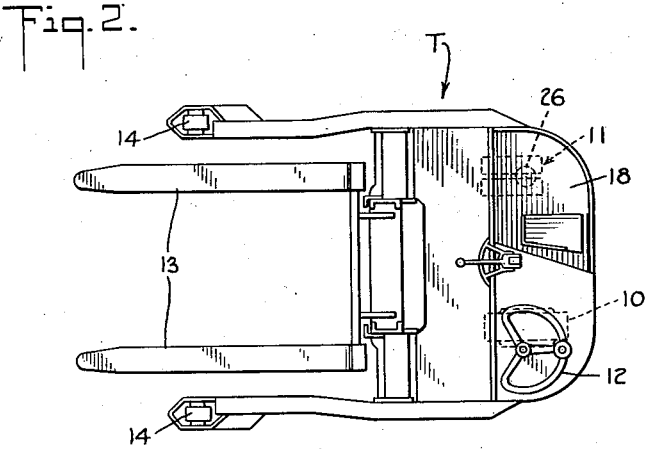
INVENTOR
George F. Quayle
BY
A. H. Golden
ATTORNEY May 28, 1957 G. F. QUAYLE 2,793,875
CASTER WHEEL TILTING MOUNT FOR CORNER DRIVE TRUCK
Filed May 18, 1954 2 Sheets-Sheet 2
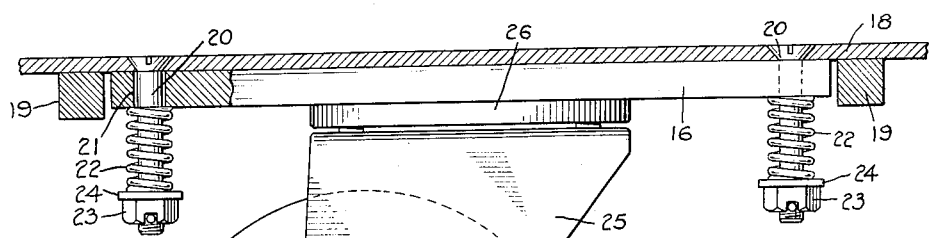
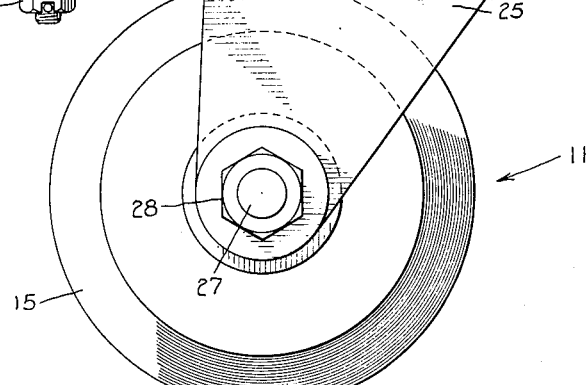
Fig. 3.
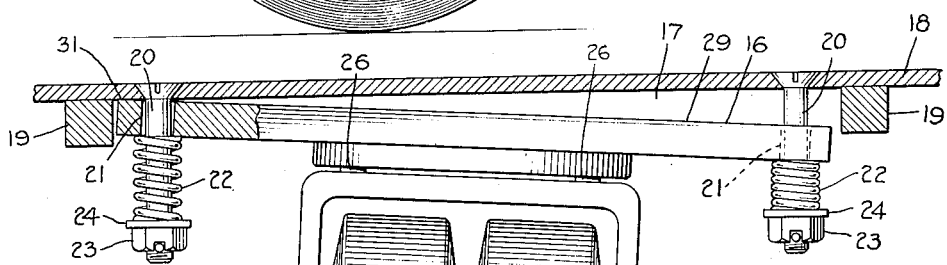
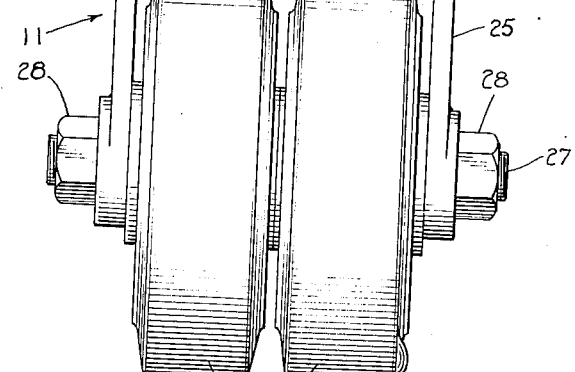
Fig. 4.
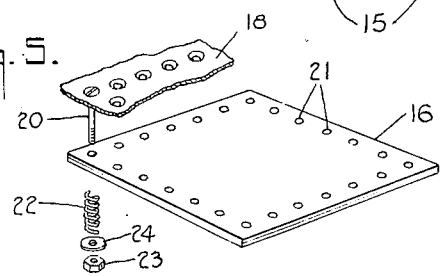
Fig. 5.
INVENTOR
George F. Quayle
BY
H. H. Golden
ATTORNEY

United States Patent Office 2,793,875
Patented May 28, 1957

2,793,875

CASTER WHEEL TILTING MOUNT FOR CORNER DRIVE TRUCK

George F. Quayle, Philadelphia, Pa., assignor to The Yale & Towne Manufacturing Company, Stamford, Conn., a corporation of Connecticut Application May 18, 1954, Serial No. 430,543

6 Claims. (Cl. 280—128)

This invention relates to industrial trucks of the type set forth in my earlier application, Ser. No. 357,757, filed May 27, 1953, now Patent No. 2,753,946, issued July 10, 1956. The trucks of this class use a steering wheel at one corner of the truck and a caster wheel at an opposed corner. In this application, I disclose an improvement over my earlier construction with novel means whereby the caster wheel and steering wheel act in combination to enable the truck to move easily when steered at a sharp angle.

In my earlier application, I mount the caster wheel of my combination for leaning movement relatively to the axis of the caster pivot on which this wheel is steered. When the steering wheel steers the truck at a sharp angle or directly reverses the truck movement, the caster wheel leans due to the friction of the ground acting in a transverse direction against the tread of the caster wheel. This leaning movement, which is opposed by spring action, reduces the frictional contact between the caster wheel and the ground and enables the caster wheel to rotate easily on its caster axis.

In the extremely novel construction that I have now conceived in a truck of this class, the steering wheel, when steering the truck at a sharp angle, effects the leaning movement of the caster wheel through leaning of the caster axis relatively to the truck. As an important feature of my invention, I equip the truck with a mounting member for the caster pivot, and this mounting member supports the truck through bearing surfaces that can move relatively to one another to enable the member to tilt. When the truck is steered at such a sharp angle as to interfere with the movement of the truck, the friction between the caster wheel and the ground causes the caster pivot to lean through tilting of its mounting member in one direction or another. Notwithstanding the ability of the mounting member to tilt, I equip this member with means that act to hold the member against tilting movement when the truck is not steered at a sharp angle or directly reversed. For the particular purpose, I prefer so to form the bearing surfaces between the mounting member and the truck that the weight of the truck normally prevents tilting of the mounting member, but I may also utilize springs to oppose the tilting movement. Thus, while the caster pivot can lean through tilting of its mounting member, the caster pivot normally is vertical. Because my novel construction enables the caster wheel to lean through leaning of the caster axis, I am able to utilize for mounting the caster wheel a rigid base member that prevents relative leaning between the caster wheel and caster axis.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a side view showing an industrial truck that embodies my extremely novel construction.

Fig. 2 is a plan view of the truck shown in Fig. 1.

Fig. 3 is a side view of the caster that I utilize in my novel construction.

Fig. 4 is an end view of the caster shown in Fig. 3, illustrating the tilting action of the caster.

Fig. 5 is a perspective view showing details of the caster mounting plate.

I show in Figs. 1 and 2 an industrial truck T of the type shown in my above-mentioned application, this truck having at one of its rear corners a combined steering and traction wheel 10, and having at its opposed rear corner a caster indicated generally by the numeral 11. The steering and traction wheel 10 is driven by a suitable motor, not shown, and is steered by a handle 12 whereby to steer the truck T on both the wheel 10 and the caster 11. The particular details of the truck T are not important to an understanding of my invention, but it may be observed that I show at the front of the truck a pair of lifting forks 13, with the truck moving on a pair of non-steering wheels 14 mounted near the forks 13.

Those skilled in the art will understand that the steering and traction wheel 10 and caster wheel 11 support and stabilize the rear end of the truck, and can be steered through a very large angle so that the truck T can be maneuvered easily in a restricted space.

To gain a full understanding of my invention, it is important to realize that the caster 11 is steered through movement of its caster pivot, with the friction of the ground acting in a transverse direction against the wheel tread to rotate the caster on this pivot. The frictional contact between the caster and the ground does, however, oppose the steering of the caster, and interferes with the movement of the truck T when the steering wheel 10 steers the truck at a sharp angle. In my earlier application, I facilitate the movement of the truck by causing the caster to lean to reduce its frictional contact with the ground when sharply steered. In the novel construction that I have now conceived, I accomplish the leaning movement of the caster 11 through a leaning movement of the caster axis, as will best be understood by reference to Figs. 3 and 4.

I illustrate dual caster wheels 15 for the caster 11, but it is to be understood that the particular number or form of these wheels is not important, and for the purposes of my invention I may utilize one or more caster wheels rotating on a common mounting. In the preferred form of my construction, I mount the caster wheels 15 through a mounting member 16, Figs. 3, 4 and 5, that is formed as a flat square plate. This plate 16 is adapted to seat in a correspondingly shaped pocket 17 at the lower side of a horizontal main frame member 18 on the truck T. To form the sides of the pocket 17, I show bars 19 secured to the lower side of the frame member 18, but the particular manner in which this pocket is constructed is immaterial. I equip the frame member 18 with a series of screws 20 for retaining the mounting member 16 relatively to the pocket 17, these screws extending downwardly through openings 21 near the sides of the mounting member 16. The screws 20 are positioned loosely in the openings 21, and I prefer to equip these screws below the member 16 with coil springs 22 retained thereon by nuts 23 and washers 24. In this arrangement, it is possible for the mounting member 16 to tilt in opposed directions in the pocket 17 relatively to the truck frame member 18, with the springs 22 yielding to permit this movement.

Below the mounting member 16 is a caster base 25 in the form of a rigid yoke, and this yoke is pivoted through pivot bearings 26 to rotate in a castering axis relatively to the mounting member 16. I equip the yoke 25 at its lower end with a transverse axle shaft 27 for the caster wheels 15, this axle 27 being retained by nuts 28 and mounted in offset relation to the castering axis, as will be understood. It is important to note at this point that the axle shaft 27, while offset from the castering axis, is nevertheless positioned inwardly from the edges of the caster mounting member 16. Stated in other words, the mounting member 16 is of sufficient horizontal extent that its edges are outward from the axle 27 without regard to the position to which the caster rotates on the caster bearings 26. Thereby the caster wheels 15 can act always through the base member 25 and mounting member 16 to support the truck. Furthermore, the weight of the truck acts normally to hold the mounting member 16 with its upper surface 29 seated in the pocket 17. Through this novel arrangement, the mounting member 16 normally does not tilt, but when the steering and driving wheel 10 acts by steering the truck to apply a considerable transverse pressure to the caster wheels 15, the mounting member 16 tilts in a corresponding direction. This will be very well understood when considering Fig. 4, in whichI show the mounting member 16 tilting upon one edge portion 31 of this member, with the upper bearing surface 29 of the member 16 then separating from the pocket 17 at the opposed edge of the mounting member 16. It will be realized that the caster axis leans simultaneously with the tilting of the mounting member 16, with the caster wheels 15 also leaning to reduce their frictional contact with the ground.

While the tilting of the mounting member 16 is opposed by the weight of the truck, it will be observed that the coil springs 22 also oppose this tilting movement. Thus, when the truck T is not steered at a sharp angle, the coil springs 22 and the weight of the truck act together to hold the mounting member 16 in seated position in the pocket 17. I can utilize merely the weight of the truck for this purpose, but I prefer to utilize also the springs 22 because these springs, while enabling the mounting member 16 to tilt, act at all times to retain the mounting member 16 somewhat more firmly relatively to the truck. It is possible, of course, so to arrange my novel construction that the tilting movement is opposed solely through the springs 22, but by utilizing the truck weight as well as the springs 22, I am able to make the springs relatively small and to mount these springs in a very compact arrangement.

I believe that those skilled in the art will now understand that I have contributed extremely novel means whereby I enable the steering wheel of a truck of this type to steer the truck very easily at a sharp angle. Normally, the caster wheels 15 will be vertical as the truck travels over the ground, but when the steering wheel 10 steers the truck T at such a sharp angle that the caster wheels 15 interfere with the truck movement, these caster wheels will lean through leaning of their caster axis. This leaning movement of the caster axis facilitates the movement of the truck because the caster wheels then reduce their frictional contact with the ground. Moreover, while contributing this leaning movement of the caster wheels 15, I am able to mount these wheels through a rigid base member so that leaning movement does not occur between the wheels and their caster axis. I believe, therefore, that the very considerable value of my invention will be fully appreciated.

I now claim:

1. In a truck of the class described having a main frame, a steering wheel mounted on said main frame for steering the truck, a caster wheel, a mounting member, means mounting the mounting member relatively to the main frame for tilting movement thereon, means mounting the caster wheel on the mounting member for swiveling movement with respect to said mounting member about a caster axis offset from the vertical plane containing the axis of rotation of said caster wheel, said caster wheel moving in said caster axis through frictional contact with the ground when the steering wheel steers the truck, spring means opposing the tilting movement of said mounting member whereby to hold the caster axis normally parallel to the steering axis of the steering wheel, and said steering wheel when steering the truck at a sharp angle effecting leaning movement of the caster axis through yielding of the spring means whereby the caster wheel leans to facilitate the movement of the truck.

2. In a truck of the class described having a main frame, a steering wheel mounted on said main frame for steering the truck, a caster wheel, a mounting member, means mounting the mounting member relatively to the main frame for tilting movement thereon, means mounting the caster wheel on the mounting member for swiveling movement with respect to said mounting member about a caster axis offset from the vertical plane containing the axis of rotation of said caster wheel, said caster wheel moving in said caster axis through frictional contact with the ground when the steering wheel steers the truck, said mounting member and main frame formed with surfaces coacting to support the truck through said mounting member with the weight of the truck opposing tilting of the mounting member whereby to hold the caster axis normally parallel to the steering axis of the steering wheel, and said steering wheel when steering the truck at a sharp angle effecting tilting of the mounting member against the opposed action of the weight of the truck whereby the caster wheel leans to facilitate the movement of the truck.

3. In a truck of the class described having a main frame, a steering wheel mounted on said main frame for steering the truck, a mounting member, means mounting the caster wheel on the mounting member for swiveling movement with respect to said mounting member about a caster axis offset from a vertical plane containing the axis of rotation of the caster wheel when the steering wheel steers the truck, complementary surfaces on said mounting member and main frame coacting for supporting said truck through said mounting member, means holding the mounting member assembled relatively to the main frame while enabling portions of said complementary surfaces to separate through tilting of said mounting member about other portions of said complementary surfaces relatively to said main frame, said member so tilting incidental to the steering of the truck at a sharp angle, and spring means opposing said tilting whereby to hold the caster axis normally parallel to the steering axis of the steering wheel.

4. In a truck of the class described having a main frame, a steering wheel mounted on said main frame for steering the truck, a mounting member, a caster wheel, means mounting the caster wheel on the mounting member for swiveling movement with respect to said mounting member about a caster axis offset from the vertical plane containing the axis of rotation of the caster wheel when the steering wheel steers the truck, complementary surfaces on said mounting member and main frame coacting for supporting said truck through said mounting member, means holding the mounting member assembled relatively to the main frame while enabling portions of said complementary surfaces to separate so that said mounting member will tilt relatively to said main frame, said member tilting incidental to the steering of the truck at a sharp angle whereby the caster wheel and its caster axis then tilt to facilitate movement of the truck, and means acting normally to press the surface portions into contact with one another to oppose said tilting whereby to hold the caster axis parallel to the steering axis of the steering wheel.

5. In a truck of the class described having a main frame, a steering wheel mounted on said main frame for steering the truck, a mounting member, a caster wheel, means mounting the caster wheel on the mounting member for swiveling movement with respect to said mounting member about a caster axis offset from the vertical plane containing the axis of rotation of the caster wheel, said caster wheel moving in said caster axis through frictional contact with the ground when the steering wheel steers the truck, complementary bearing surfaces on said mounting member and main frame moving relatively to one another through tilting of said mounting member relatively to said main frame incidental to the steering of the truck at a sharp angle, the caster wheel and its caster axis then tilting bodily with said mounting member whereby to facilitate movement of the truck, said bearing surfaces coacting for supporting the truck through said mounting member, and means opposing said tilting to hold the caster axis normally parallel to the steering axis of the steering wheel.

6. In a truck of the class described having a main frame, a steering wheel mounted on said main frame for steering the truck, a mounting member, a caster wheel, means mounting the caster wheel on the mounting member for swiveling movement with respect to said mounting member about a caster axis offset from the vertical plane containing the axis of rotation of the caster wheel when the steering wheel steers the truck, complementary surfaces on said mounting member and main frame coacting for supporting said truck through said mounting member, means holding the mounting member in position relatively to the main frame while enabling portions of said complementary surfaces to separate through tilting of the mounting member about other portions of said complementary surfaces relatively to said main frame, said member so tilting incidental to the steering of said truck at a sharp angle whereby the caster wheel and its caster axis then tilt to facilitate movement of the truck, and the weight of the truck acting normally through said complementary surfaces to hold the mounting member against tilting whereby to hold the caster axis normally parallel to the steering axis of the steering wheel.

References Cited in the file of this patent

UNITED STATES PATENTS

| | | |
|---|---|---|
| 243,436 | Duffey | June 28, 1881 |
| 307,840 | Burton | Nov. 11, 1884 |
| 319,839 | Nelson | June 9, 1885 |
| 901,136 | White | Oct. 13, 1908 |
| 2,564,002 | Gibson | Aug. 14, 1951 |